United States Patent [19]

Rando

[11] Patent Number: 5,621,975
[45] Date of Patent: Apr. 22, 1997

[54] REMOTELY CONTROLLED SELF-LEVELING LASER INSTRUMENT WITH MODULAR CAPABILITY

[75] Inventor: Joseph F. Rando, Los Altos Hills, Calif.

[73] Assignee: Levelite Technology, Mt. View, Calif.

[21] Appl. No.: 517,989

[22] Filed: Aug. 22, 1995

[51] Int. Cl.⁶ .............................. G01B 11/26; G02B 7/00
[52] U.S. Cl. .............................. 33/227; 33/1 PT; 33/286; 33/293; 33/DIG. 21
[58] Field of Search ...................... 33/227, 1 PT, 33/228, 285, 286, 290, 291, 293, DIG. 21

[56] References Cited

U.S. PATENT DOCUMENTS

| | | | |
|---|---|---|---|
| 3,471,234 | 10/1969 | Studebaker | 33/285 |
| 3,588,249 | 6/1971 | Studebaker | 356/4 |
| 3,897,637 | 8/1975 | Genho | 33/227 |
| 3,936,197 | 2/1976 | Aldrink | 356/250 |
| 4,062,634 | 12/1977 | Rando et al. | 356/248 |
| 4,221,483 | 9/1980 | Rando | 356/250 |
| 4,852,265 | 8/1989 | Rando | 33/227 |
| 4,912,851 | 4/1990 | Rando et al. | 33/227 |
| 4,993,161 | 2/1991 | Borkovitz | 33/291 |
| 5,075,977 | 12/1991 | Rando | 33/227 |
| 5,144,487 | 9/1992 | Hersey | 359/629 |
| 5,459,932 | 10/1995 | Rando et al. | 33/291 |

*Primary Examiner*—Christopher W. Fulton
*Attorney, Agent, or Firm*—Thomas M. Freiburger

[57] ABSTRACT

A system for use in construction or similar activities, for layout of points or lines using a projected laser beam includes a remotely controlled turntable unit having a rotatable turntable for receiving a portable, hand-carryable self-leveling laser projecting instrument. The portable self-leveling laser instrument preferably has a relatively wide self-leveling range, such as up to about 4° in two axes, and is useful in layout operations separate from the remote turntable. When placed on the remote turntable unit, the direction of pointing of the laser or lasers from the instrument can be controlled by the operator from a distance, through operation of a hand-held remote unit having directional buttons which control a motor of the turntable unit. Provision can be included for measuring angles on the turntable unit, for varying the speed of rotation of the turntable, as by holding down one of the buttons, and for generating a preselected angle (such as 90°) from a remote position. Wireless signals are sent from the hand-held remote control unit to the turntable unit, which may be LED optical signals in one preferred embodiment.

14 Claims, 7 Drawing Sheets

REMOTELY CONTROLLED SELF-LEVELING LASER INSTRUMENT WITH MODULAR CAPABILITY

BACKGROUND OF THE INVENTION

This invention relates to laser tools used in construction measurement and the use of laser beams to indicate reference lines and planes. In particular, the invention relates to locating lines at 90 degrees (or other angles) to each other in the horizontal planes as are commonly used in the construction industry. Laser instruments of this type project a beam or beams of laser light which indicate points along a line. The line may be an element of a horizontal plane. The invention consists of a self-leveling laser with a wide self-leveling range and a remote-controlled turntable which is easily detachable from the laser.

In the simplest case of the prior art, a laser projector is mounted to a carpenter's level and projects a laser beam parallel to the axis of the level. The spot produced by the beam striking a surface along the projected line indicates a point on the level reference line. This basic laser tool is described in Genho U.S. Pat. No. 3,897,637. In this case, the carpenter's level must be adjusted to level using the level vials on the instrument. In Rando U.S. Pat. Nos. 4,852,265, 4,912,851, Hersey U.S. Pat. No. 5,144,487 and Rando U.S. Pat. No. 5,075,977, as well as in copending Rando application Ser. No. 248,517 (filed May 24, 1994) a self-leveling laser instrument is described which projects a level laser beam despite the tilt of the housing. A reference plane can be generated by rotating the above self-leveling laser instrument about a point on a substantially horizontal surface. Since the height of the instrument has not changed substantially during the rotation, every projected line is an element in the level plane.

Today it is most common to generate the laser reference plane by projecting the laser beam into a rotating pentaprism. This technique is described in Studebaker U.S. Pat. No. 3,588,249, Aldrink U.S. Pat. No. 3,936,197, Rando U.S. Pat. Nos. 4,062,634 and 4,221,483, Borkovitz U.S. Pat. No. 4,993,161 and others. In all cases, the housing is fixed and a beam is rotated to generate a plane. Normally these instruments are mounted on a tripod and require setup by the operator. The tripods are generally heavy and clumsy to carry and set up. Most of the self-leveling laser instruments require an adjustment base under the laser or on the instrument to adjust the base of the instrument to be within the self-leveling range. Most of these instruments have a self-leveling range of only 15 minutes of arc requiring some time to set up. This set-up time is costly for the operator. Instruments with a self-leveling range of several degrees do not require adjustments for leveling and thus are more productive to use.

Generally speaking, a rotating beam is too weak to see and a sensitive detector is needed. To locate the beam the detector is manually raised and lowered in the beam to locate center. A visual display on the detector or an audio tone indicates the beam position to the user. The goal of the instrument described above and the present invention is to mark points at the same elevation or along a given line. When the beam is not rotating, the center of the spot may be marked with a pencil. When a detector is used, a reference notch on the detector guides the pencil mark.

It is sometimes common to point a stationary laser beam with the same motor which is normally used to rotate the beam continuously. In this way, the operator can mark desired locations within the job site without using an expensive detector. When the spot is visible on the wall, it is quickly and easily marked with a pencil. The disadvantage of this system is that the operator must move the beam to a new location for each point. This means he must walk back and forth between the laser and the point to be marked, which is very time consuming.

In the prior art shown in FIG. 1, a level plane may be established by positioning a self-leveling laser instrument over a point and rotating the instrument as needed to mark points in the plane. In this case, the operator must walk back and forth between the laser instrument and to make each mark, which as noted above is time consuming. The laser instrument shown in FIG. 1 has two beams at 90 degrees to each other which can be used to represent a building corner.

In the tripod mounted laser instrument shown in FIG. 2, the rotating head may be used to point the beam at the locations desired. Such pointing can be done manually or with a remote control device (not shown). In the tripod mounted instrument the laser beam was rotated internally in the instrument, via a pentaprism, and the instrument was self-leveling only within a very narrow range. The instrument lacked the versatility of a hand-carryable, self-leveling instrument, useful separately from a remotely controlled turntable as in the present invention described below.

SUMMARY OF THE INVENTION

The invention encompasses an apparatus for remotely directing the rotation of a self-leveling laser beam instrument about a substantially vertical axis to facilitate its use in establishing elements of a level reference plane used in construction measurement. The laser beam instrument may project one or more beams of light. The system consists of a hand-carryable self-leveling laser instrument of relatively wide self-leveling range (to about 4°), and turntable whose rotation is controlled by a simple wireless transmitter allowing the pointing of an alignment laser beam or beams. This allows the operator to stand near the projected spot so that he may conveniently mark points on a wall or other building element to indicate a horizontal reference plane without having to go back to the laser instrument.

In one case where the self-leveling laser instrument projects two beams of light at 90 degrees to each other, the operator can finely position one of the beams on a reference point by standing near the point, operating the remotely controlled turntable, and observing the laser spot at close range. Since the second beam is maintained at 90 degrees to the first, the second point for the 90 degree corner is easily located.

In another case where the self-leveling laser instrument projects one laser beam the operator may, after first causing the beam to project at a known first point, stand at the instrument and rotate the instrument by a known angle using a scale on the turntable device to determine the angle through which the beam has been rotated.

The portability of the laser instrument is greatly improved by making the turntable detachable from the self-leveling laser instrument. The basic laser instrument is small and can easily be carried by hand or on the belt or in a pocket. When the remote pointing feature is needed, the remote controlled turntable can be simply attached. Tripod mounted instruments are much less portable and awkward to use in the applications described above.

It is therefore among the objects of the invention to provide for efficient use of a self-leveling laser tool in construction layout procedures, through a remote controlled turntable capable of use by an operator positioned remotely from the laser tool and turntable for convenient one-man operation in marking points at elevations at a construction site. These and other objects, advantages and features of the invention will be apparent from the following description of a preferred embodiment, considered along with the accompanying drawings.

DESCRIPTION OF PREFERRED EMBODIMENTS

In a preferred embodiment the system of the invention consists of a turntable with a built in receiver module which receives a signal for clockwise or counter-clockwise rotation, and a small hand-held control module. The operator presses buttons on the control module to transmit a signal to the receiver module. This signal is received and used to drive a DC motor in either the clockwise or counterclockwise direction. The technology for this wireless remote control is similar to that used in a garage door opener and well known in the industry. Optical transmission using light emitting diodes is an alternate communication technology which could be used to link the hand-held transmitter with the motor control unit. Using belts or O-rings (or reduction gearing), this rotation of the DC motor is converted to slow rotation or small steps by a pulley system. A rotation reduction of approximately 50 to 100 to one is necessary to slow the drive rotation to adequately control the spot position with the remote control device.

Figure 1:
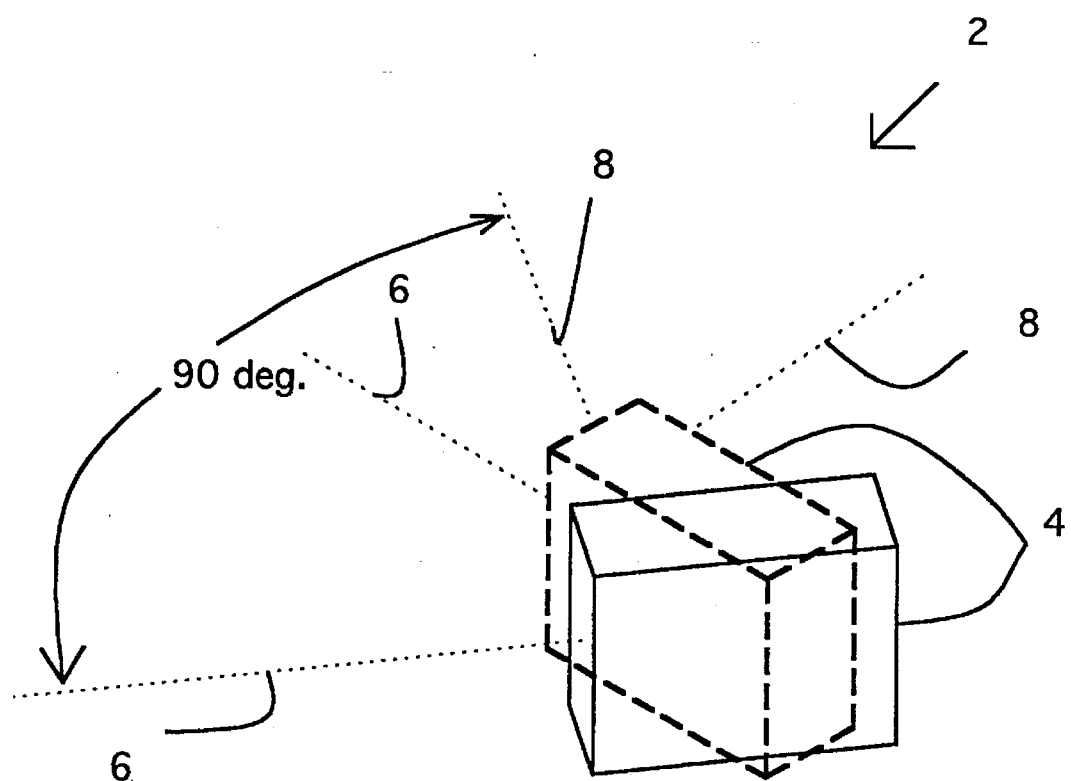
FIG. 1 is a perspective, schematic view of a self-leveling laser instrument projecting two beams of light in two orientations, in accordance with prior art.

In FIG. 1, a self-leveling laser instrument, designated generally by 2, is schematically shown in two positions. Its housing 4 is shown with solid lines in the first position. Two self-leveling beams are indicated at 6 and 8. The second position of the housing 4 is indicated by dashed lines with the respective beams again designated 6 and 8. The two beams are at an angle of 90 degrees to each other and lie in the horizontal plane. The horizontal plane is defined by the beams as the housing is rotated, and the beams remain level because the tool 4 is self-leveling. The arrangement indicated in FIG. 1 can be considered prior art in that the self-leveling laser 4 had to be manually pointed.

Figure 2:
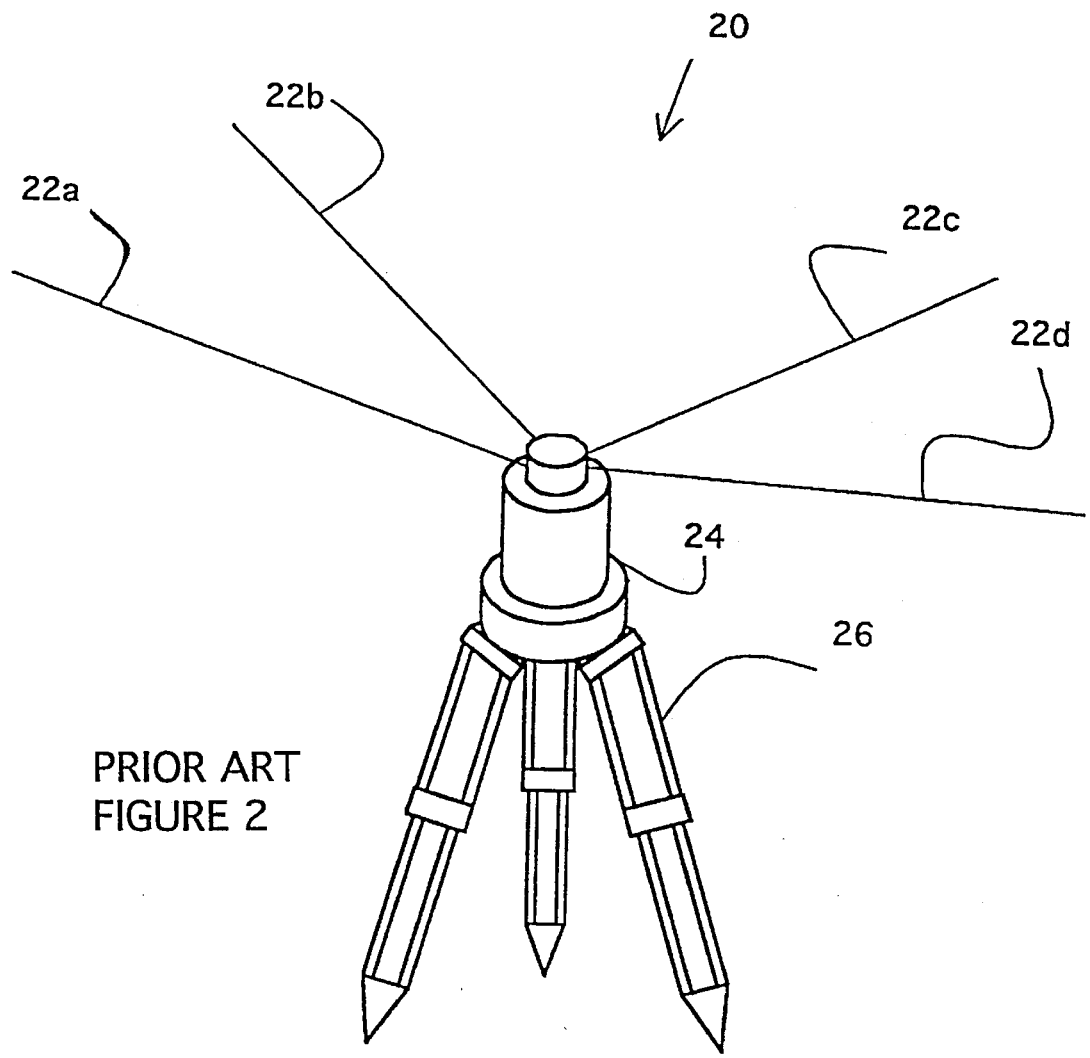
FIG. 2 is a perspective view showing a self-leveling tripod mounted laser instrument designed to project a plane of light by rotating a pentaprism, according to prior art.

A conventional rotating laser system 20 is shown in FIG. 2. In this prior art, the beams 22a–22d are in the horizontal plane. The instrument 24 is mounted on a tripod 26. In this system, the spot that is formed when the beam strikes a target is the place to mark the level plane. The device is capable of remote operation as discussed above.

Figure 3:
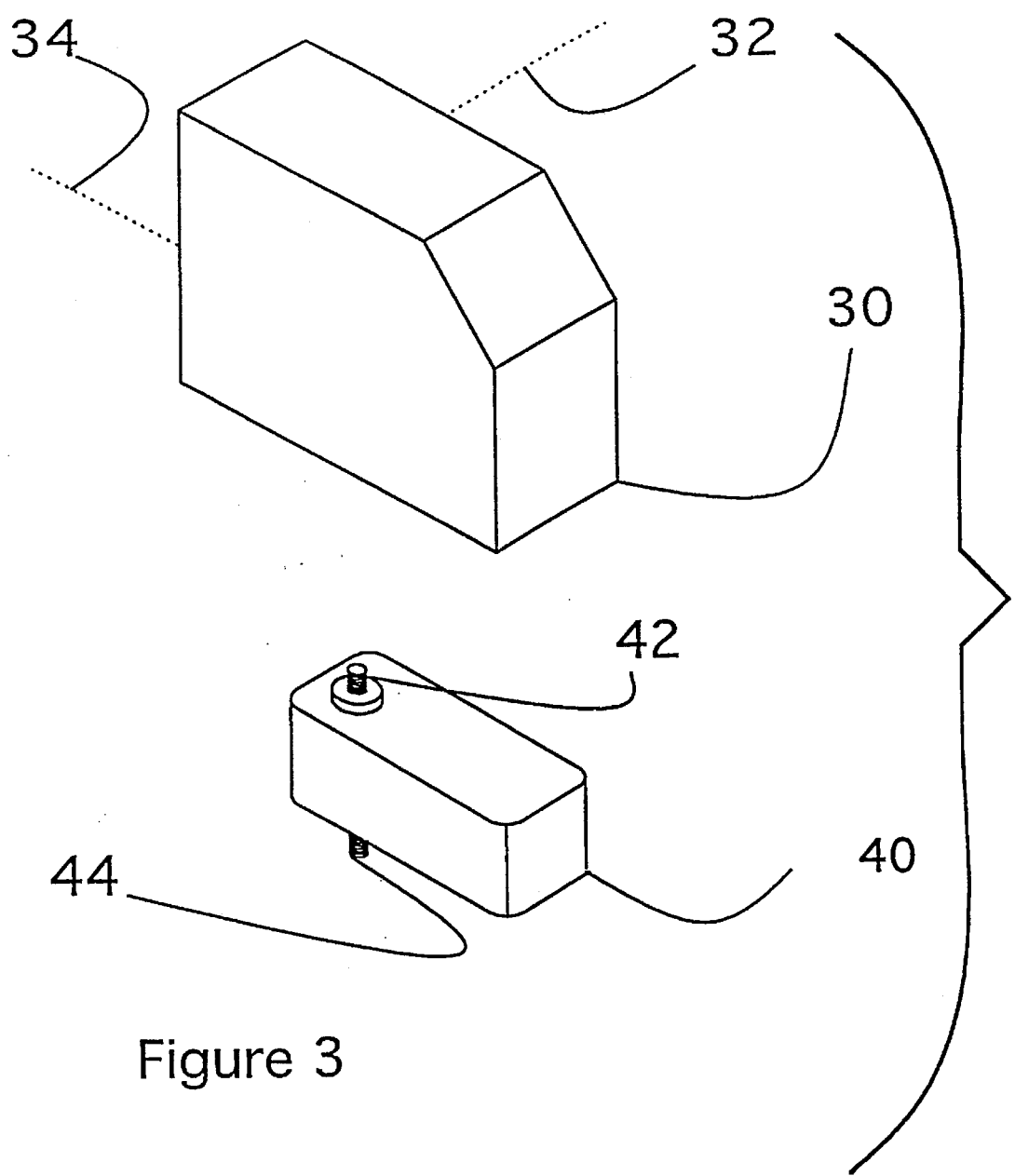
FIG. 3 is an exploded view showing the self-leveling laser instrument and the remote controlled turntable unassembled.

In FIG. 3, a self-leveling laser instrument 30, which is self-leveling in two axes, may be generally as described in copending application Ser. No. 08/248,517, filed May 24, 1994 now U.S. Pat. No. 5,459,432 and incorporated herein by reference, but in this case with an additional horizontal beam. The hand-carryable laser device 30 is shown detached from a rotating turntable 40. Horizontal beams 32 and 34 are self-leveled and at 90 degrees to each other, thus lying in a common plane. The laser instrument 30 is attached to the rotating table 40 by a threaded rod 42 on the turntable, received in a threaded hole in the bottom of the laser instrument. A lower threaded rod 44 is available to mount the rotating turntable to a tripod or a clamp, or a threaded hole can be provided without the rod 44. This threaded rod rigidly supports the turntable. The turntable may as an alternative be set on a stable, generally horizontal surface. For this purpose the rod 44 can be made removable, as discussed further below. Similarly, securing of the laser instrument to the turntable can be by stably positioning the instrument on a flat surface of the turntable, and the term "securing" so used herein is intended to include such stable resting of the instrument without any further mechanical attachment.

Figure 4:
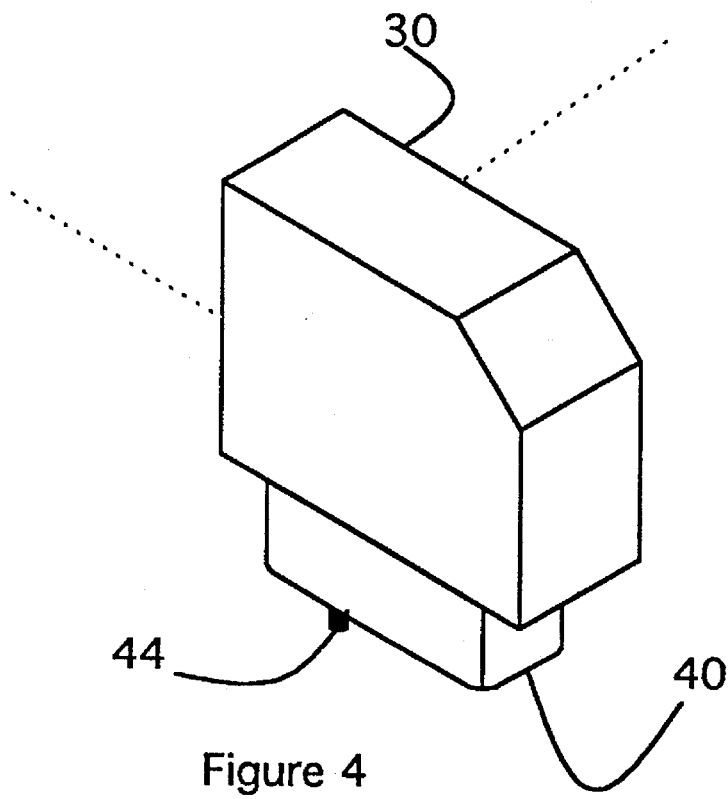
FIG. 4 is a perspective view showing the self-leveling laser instrument mounted to the remote-controlled turntable.

In FIG. 4, the turntable 40 is secured to the laser instrument 30, with the turntable 40 securely positioned such as on a tripod (not shown). The beam can now be directed by the remote control unit. As noted above the remote turntable can be mounted in other ways as may be appropriate for the particular conditions. These include clamping the turntable to building supports or resting the turntable on a concrete block, a brick or other stable object.

Figure 5:
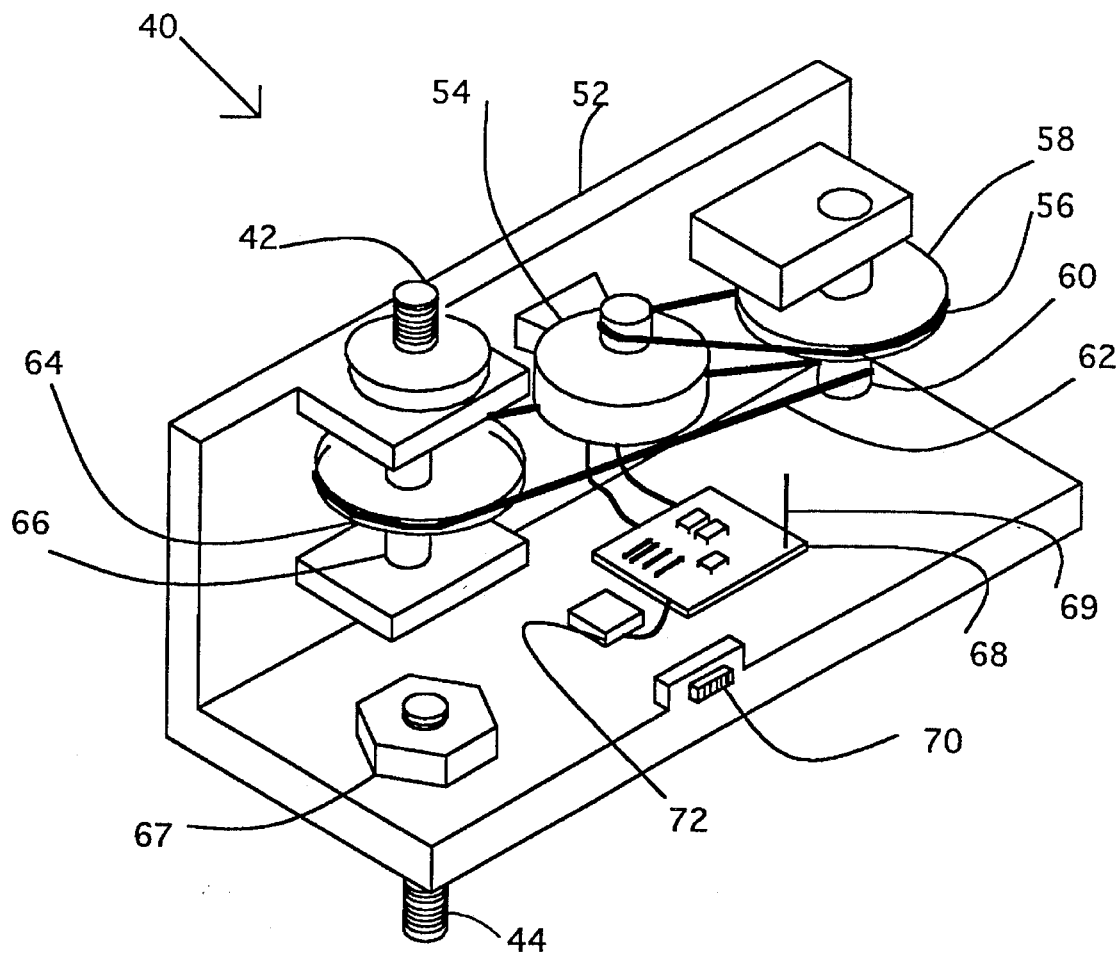
FIG. 5 is a perspective view showing one embodiment of an internal drive mechanism for the turntable.

FIG. 5 shows the drive mechanism of the turntable 40 in detail, with some of the housing of the turntable unit removed. The parts are supported on a frame 52. A DC motor 54 drives a belt 56 on a pulley 58. A shaft 60 supporting the pulley 58 is grooved to drive a belt 62, which drives another pulley 64 on a shaft 66. This shaft is part of the threaded rod 42 as shown. The threaded rod 44 below is fastened to the frame 52 by appropriate means, preferably by insertion into a threaded hole in the frame 52 or into a threaded nut 67 secured permanently to the frame, as by welding. This enables the threaded rod 44 to be removed to accommodate a tripod or other mounting device having a threaded rod or bolt.

Also secured to the frame 52 is a remote control circuit board 68 which operates the DC motor 54 and includes a signal receiver (not specifically shown) and an antenna 69. An on/off switch 70 and a battery 72 are likewise mounted to the frame 52. Other mechanical constructions of the remote turntable unit 40 are possible, such as using reduction gearing instead of pulleys and belts, or a worm gear, etc.

Figure 6:
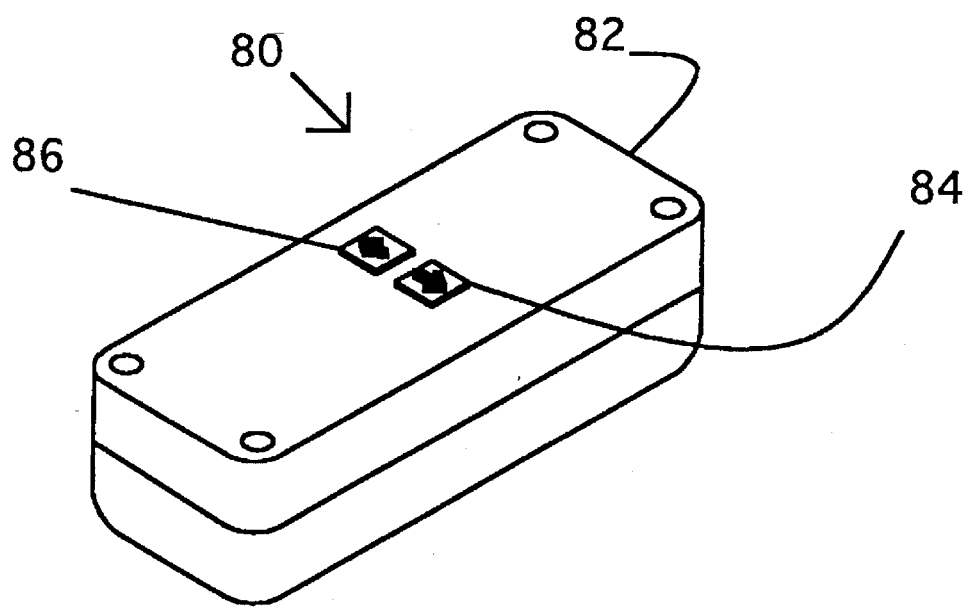
FIG. 6 is a perspective view of a hand-held the remote control module for remotely operating the turntable.

A hand held remote control unit 80 of the system of the invention is shown in FIG. 6. The battery and wireless electronics are contained within a light weight housing 82. Control buttons 84 and 86 (preferably impulse switches) indicate direction of motion of the beam when the remote unit is held upright. The unit is ergonomically designed to be small and convenient to use. In use the operator simply holds the remote hand held unit 80 and pushes the appropriate button 84 or 86 until the laser beam of the tool 30 projects at a defined point. Then an angle can be tuned as desired. The unit 80 includes a signal transmitter and antenna (not shown) for sending signals to the remote turntable 40. As one example, LED optical communications can be used; radio frequency of infrared could also be used. If desired, the turntable can have variable rotation speed under the control of the operator. For example, the receiver and circuit board 68 on the turntable unit 40 can have provision for accelerating to a secondary, higher speed of rotation when a button (84, 86) is held down for a preset period of time. Release of the button and re-pressing would then return the unit to the slower, basic speed. Such speed variation equipment is well-known, and is employed in such devices as compact disc players for changing location of the reading head and clocks, for setting time.

Figure 7:
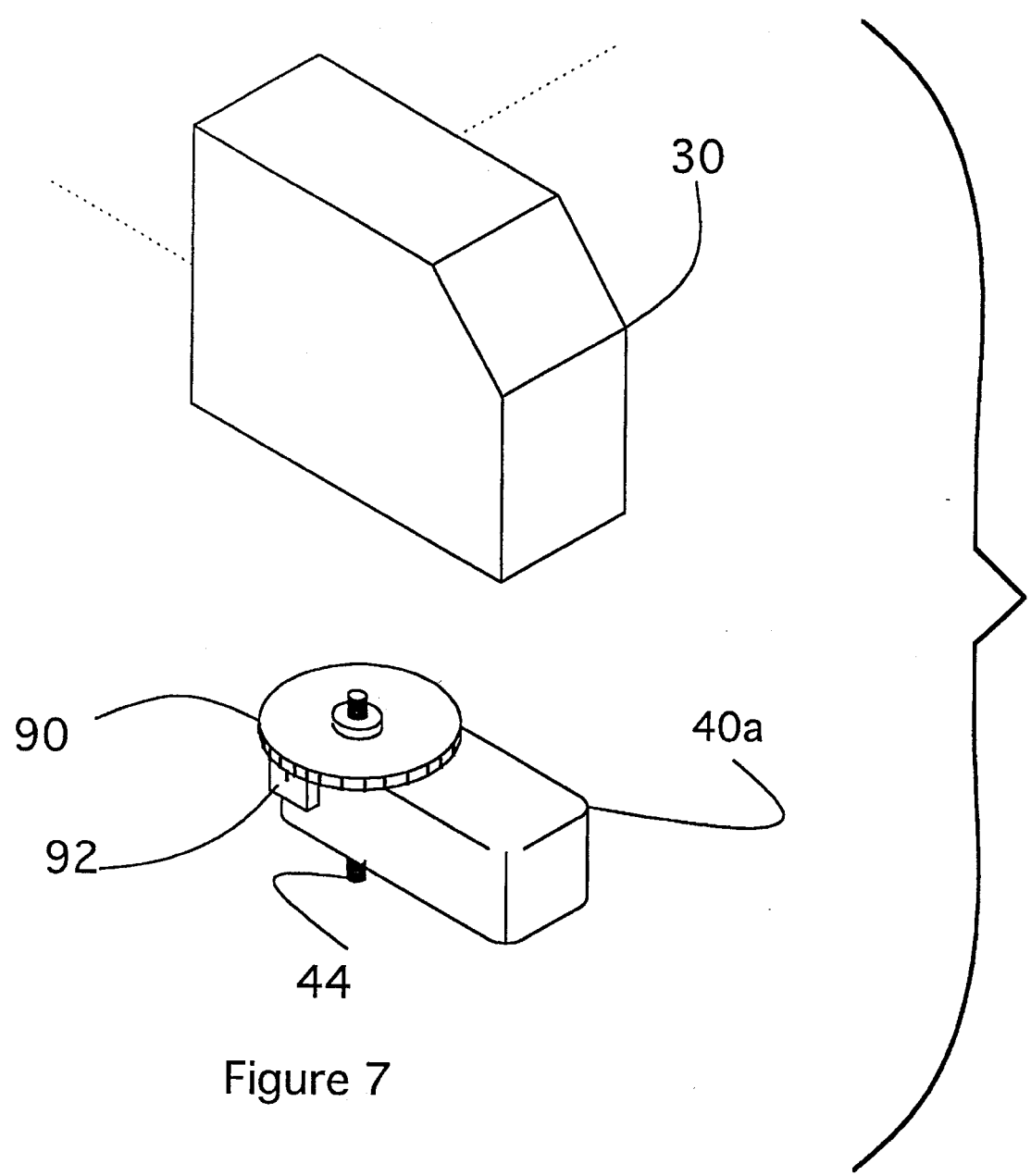
FIG. 7 is an exploded view of the unassembled self-leveling laser instrument and remote controlled turntable, which in this embodiment includes a scale for indicating angle of rotation of the turntable and laser instrument.

FIG. 7 shows a human readable scale 90 on the turntable with a reference mark 92 on the fixed portion of the turntable. One skilled in the art will see that a vernier can be added to the mark to increase the accuracy of scale reading. Likewise the scale and the fixed mark positions could be exchanged and the scale or mark could be movable to facilitate adjusting the starting point for an angle measurement. These and other variations will be apparent to one skilled in the art.

The remote turntable unit 40a with the scale 90 can be provided with an electronic or mechanical angle stop (not shown) for enabling the operator, once he has set the beam to an initial point, to swing a desired arc such as 90°, thus avoiding the need to go to the turntable 40a to read the scale as the angle is generated.

The laser instrument is self-leveling, and the remote turntable itself will usually be slightly off-horizontal, such as within 4 degrees of horizontal. This will affect the generation of a desired angle only very slightly, creating an error so small as to be negligible.

Figure 8:
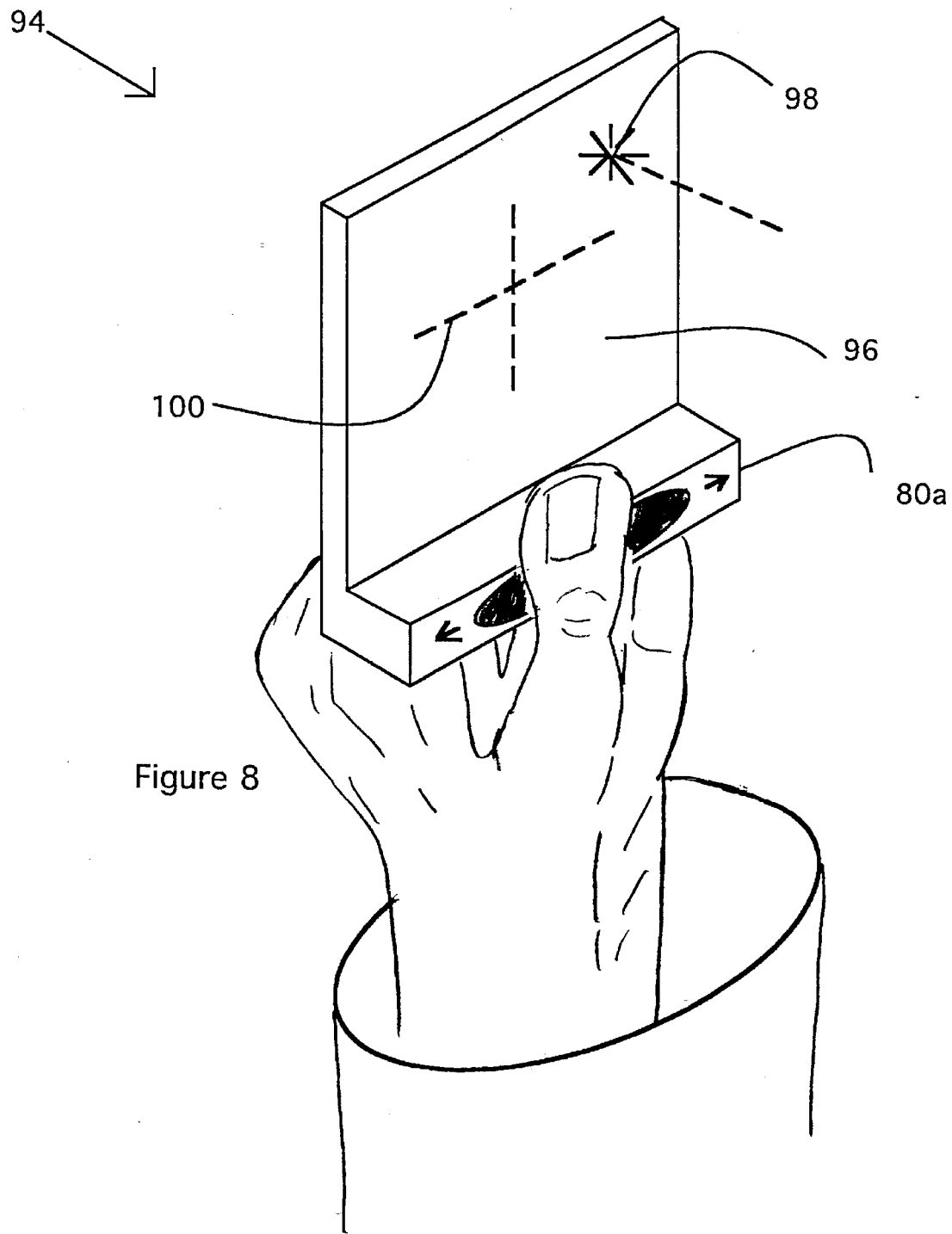
FIG. 8 is a perspective view showing a laser target combined with a hand held remote control module.

FIG. 8 shows a target unit 94 which has a target 96 and includes an attached hand held remote control unit 80a, the unit 80a being similar to the unit 80 described earlier, with button switches for moving the turntable. The target unit 94 is shown held by an operator. By holding the target 96 over a known point and remotely rotating the turntable to bring a laser beam spot 98 in line with a crosshair or other mark 100, the operator can locate the beam in a level line at a construction site. Then, after rotating the turntable and laser instrument through an angle of 90° (for example), wherein the beam remains in a level plane, the operator can find the desired 90°-rotated point by moving the target 96 until the mark 100 moves into beam spot 98, and a locating mark is then made on the site. This operation is more conveniently carried out if the system includes provision for generating a selected angle remotely, as discussed above.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. A system for use in layout of points or lines using a projected laser beam, comprising:

a hand carryable two-axis self-leveling laser instrument having an instrument housing and means for projecting at least one substantially horizontal laser beam in spite of a small tilt of the housing, a remotely controlled turntable unit independent and separate from the laser instrument and having a motor positioned in a turntable unit housing and a rotatable turntable on the turntable unit housing connected to be rotated by the motor, and including means for receiving remote wireless signals to cause the motor to incrementally rotate the turntable as desired, a hand held remote control unit having transmitter means for sending wireless signals to the remotely controlled turntable unit to cause the motor to rotate the turntable, with at least one control button switch for enabling an operator to send signals as desired for control of rotation of the turntable, and means for securing the self-leveling laser instrument to the rotatable turntable of the remotely controlled turntable unit, so that an operator can rotate the laser instrument to swing the aim of the laser beam as desired from an operator position remote from the laser instrument.

2. The system of claim 1, further including rotational position-indicating scale means operable between the rotatable turntable and the turntable unit housing, for indicating degree of rotation between different positions of the rotatable turntable.

3. The system of claim 1, wherein the self-leveling laser instrument includes means for projecting two substantially horizontal beams at right angles to each other.

4. The system of claim 1, wherein the motor of the remotely controlled turntable unit comprises a DC motor.

5. The system of claim 4, further including motor speed reduction means between the DC motor and rotatable turntable, including pulleys connected by belts.

6. The system of claim 1, wherein the hand held remote control unit includes a pair of said control button switches, each with an arrow indicating a different direction of intended rotation of the turntable, said switches having means for sending signals effective to rotate the turntable in the indicated direction while held down by an operator.

7. The system of claim 1, wherein the remotely controlled turntable unit includes means for varying the speed of rotation of the turntable.

8. The system of claim 7, further including speed control means on the hand held remote control unit, for enabling an operator to remotely control the speed of rotation of the rotatable turntable.

9. The system of claim 8, wherein the speed control means comprises means for increasing the speed of rotation by holding a control button switch for a preset period of time.

10. The system of claim 1, wherein the signals generated from the hand held remote control unit and sent to the remotely controlled turntable unit are LED optical signals, the hand held remote control unit including means for generating LED optical signals, and the remotely controlled turntable unit including means for receiving LED optical signals for controlling the motor of the remotely controlled turntable unit.

11. A method for use in layout of points or lines using a projected laser beam, comprising the steps of:

providing a hand carryable self-leveling laser instrument having a laser instrument housing and means for projecting at least one substantially horizontal laser beam in spite of a small tilt of the housing, providing a remotely controlled turntable unit independent and separate from the laser instrument and having a motor positioned in a turntable unit housing and a rotatable turntable on the turntable unit housing connected to be rotated by the motor, and including means for receiving remote wireless signals to cause the motor to incrementally rotate the turntable as desired, positioning the remotely controlled turntable unit at a desired location and positioning the hand-carryable self-leveling laser instrument on the rotatable turntable of the turntable unit, using a hand held remote control unit with transmitter means, sending wireless signals to the remotely controlled turntable unit and causing the motor to rotate the turntable, using a control button switch on the hand held remote unit.

12. The method of claim 11, wherein the step of positioning the laser instrument on the remotely controlled turntable unit comprises securing the laser instrument to the rotatable turntable via a threaded rod extending upwardly from the rotatable turntable, received in a threaded hole in the bottom of the laser instrument.

13. The method of claim 12, further including positioning the threaded rod of the rotatable turntable over a known point at a construction site, the laser beam of the self-leveling laser instrument being substantially aligned directly over the threaded rod, such that the projected laser beam defines substantially a line through the known point.

14. The method of claim 11, further including first using the hand held remote control unit to swing the laser instrument to point the laser beam at a point near the position of the operator, then swinging the beam using the remote control unit through a selected angle, by observation of a position-indicating scale means operable between the rotatable turntable and the turntable unit housing.

* * * * *